United States Patent
Chang et al.

(10) Patent No.: US 9,048,707 B2
(45) Date of Patent: Jun. 2, 2015

(54) LINEAR MOTOR AIR-COOLING STRUCTURE

(71) Applicant: Hiwin Mikrosystem Corp., Taichung (TW)

(72) Inventors: Yu-Jung Chang, Taichung (TW); Bo-Sheng Huang, Taichung (TW); Chih-Kai Fan, Taichung (TW)

(73) Assignee: Hiwin Mikrosystem Corp., Taichung (TW)

( * ) Notice: Subject to any disclaimer, the term of this patent is extended or adjusted under 35 U.S.C. 154(b) by 345 days.

(21) Appl. No.: 13/672,009

(22) Filed: Nov. 8, 2012

(65) Prior Publication Data

US 2014/0103748 A1  Apr. 17, 2014

(30) Foreign Application Priority Data

Oct. 11, 2012  (TW) .............................. 101137398 A

(51) Int. Cl.

| H02K 41/02 | (2006.01) |
|---|---|
| H02K 41/00 | (2006.01) |
| H02K 5/20 | (2006.01) |
| H02K 41/03 | (2006.01) |
| H02K 9/00 | (2006.01) |

(52) U.S. Cl.
CPC ................ *H02K 5/20* (2013.01); *H02K 41/031* (2013.01); *H02K 9/00* (2013.01)

(58) Field of Classification Search
CPC .............................. H02K 41/00; H02K 41/03
USPC ............ 310/12.01, 12.05, 12.09, 12.13, 12.9, 310/58, 59, 12.29
See application file for complete search history.

(56) References Cited

U.S. PATENT DOCUMENTS 6,469,406 B1 * 10/2002 Hwang et al. .............. 310/12.29

FOREIGN PATENT DOCUMENTS

| JP | 10052027 A | * | 2/1998 |
| JP | 2000245131 A | * | 9/2000 |
| JP | 2002247831 A | * | 8/2002 |
| KR | 20030039532 A | * | 5/2003 |

* cited by examiner

Primary Examiner — Jose Gonzalez Quinone
(74) Attorney, Agent, or Firm — Guice Patents PLLC

(57) ABSTRACT

A linear motor air-cooling structure includes two cooling sections. Each cooling section has an elongated board-shaped main body. The main body is attached to a lateral side of the stator of the linear motor. An air flow way is formed in the main body. The external air can be uniformly guided through the air flow way and distributed to every part of the linear motor. Accordingly, in operation, a better air-cooling effect is provided for the linear motor.

10 Claims, 5 Drawing Sheets

LINEAR MOTOR AIR-COOLING STRUCTURE

BACKGROUND OF THE INVENTION

1. Field of the Invention

The present invention relates generally to a linear motor, and more particularly to a linear motor air-cooling structure.

2. Description of the Related Art

Please refer to FIG. 1. U.S. Pat. No. 6,469,406 discloses a linear motor cooling device. Two lateral substrates 2 of the stator 1 are respectively drilled with main passages 3 for air to flow through. The inner sides of the two substrates 2 are further formed with multiple air outlets 4 in communication with the main passages 3. Accordingly, an external air source can transfer air through the main passage 3 to distribute the air the air outlets 4. In this case, airflow will flow between the substrates 2 to carry away the heat generated by the windings of the mover 5 moving between the substrates 2 and achieve a cooling effect.

The number and position of the air outlets 4 are variable to achieve heat dissipation effect by means of the airflow flowing between the stator 1 and the mover 5. However, it is necessary to drill holes on the substrates 2 of the stator to form the airflow passage. Such process is troublesome so that the manufacturing cost is quite high.

Moreover, the substrates 2 of the stator have a limited thickness so that the diameters of both the main passage 3 and the air outlets 4 are limited. As a result, the heat dissipation effect achieved by the conventional technique is limited.

SUMMARY OF THE INVENTION

It is therefore a primary object of the present invention to provide a linear motor air-cooling structure, which includes at least one air-cooling board having an air flow way. The air-cooling board is additionally disposed on one side of the stator of the linear motor as an independent component. The air conducted in from outer side can flow within the air-cooling board and flow out from multiple air outlets formed on the air-cooling board. Accordingly, the airflow can flow between the stator and the mover of the linear motor to dissipate the heat generated by the windings of the mover.

To achieve the above and other objects, the linear motor air-cooling structure of the present invention includes: at least one elongated stator having an elongated bed section and multiple magnetic sections sequentially arranged along a length of the bed section and fixedly disposed on one face of the bed section; a mover positioned in adjacency to one side of the bed section, under the action of magnetic fields created by the adjacent magnetic sections, the mover being reciprocally movable along the length of the bed section; and at least one cooling section having at least one main flow way and multiple bypass flow ways in communication with the main flow way, whereby the air flowing within the main flow way can be distributed to the respective bypass flow ways to flow out from the bypass flow ways so as to form airflow between the stator and the mover. The air-cooling structure is characterized in that the cooling section has a main body attached to one side of the stator along the length thereof. The main flow way and the bypass flow ways are disposed on the main body. Each bypass flow way has an air outlet formed on the main body. The air outlet is directed to the mover in a direction away from the bed section.

The present invention can be best understood through the following description and accompanying drawings, wherein:

BRIEF DESCRIPTION OF THE DRAWINGS

FIG. 4A is an enlarged view of circled area A of FIG. 4; and

DETAILED DESCRIPTION OF THE PREFERRED EMBODIMENTS

Figure 1:
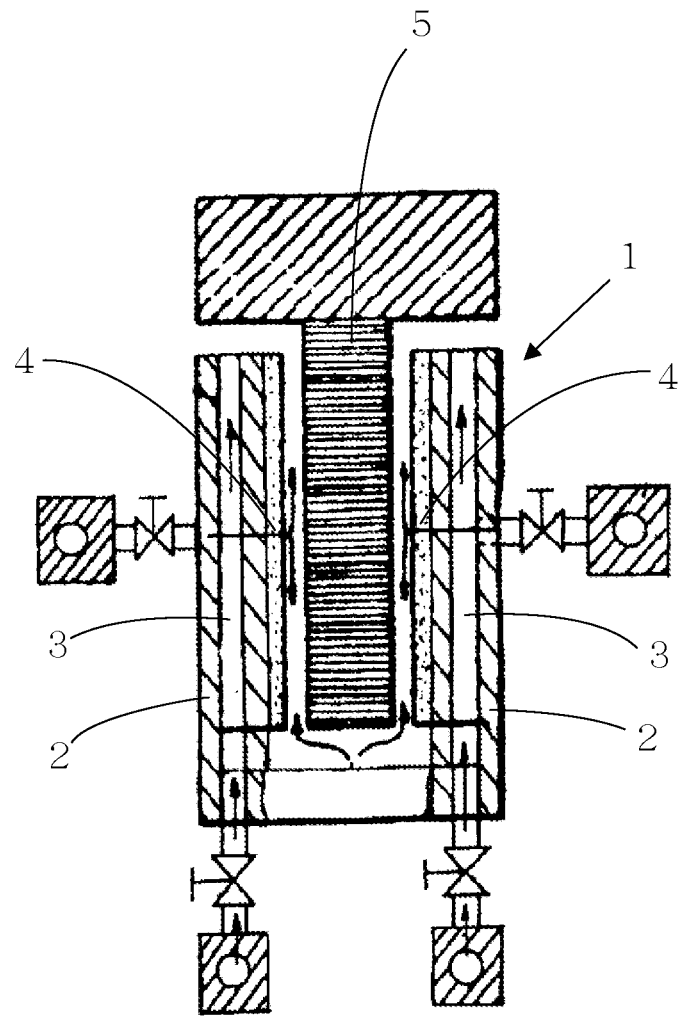
FIG. 1 is a sectional view of a conventional linear motor cooling device.
Figure 2:
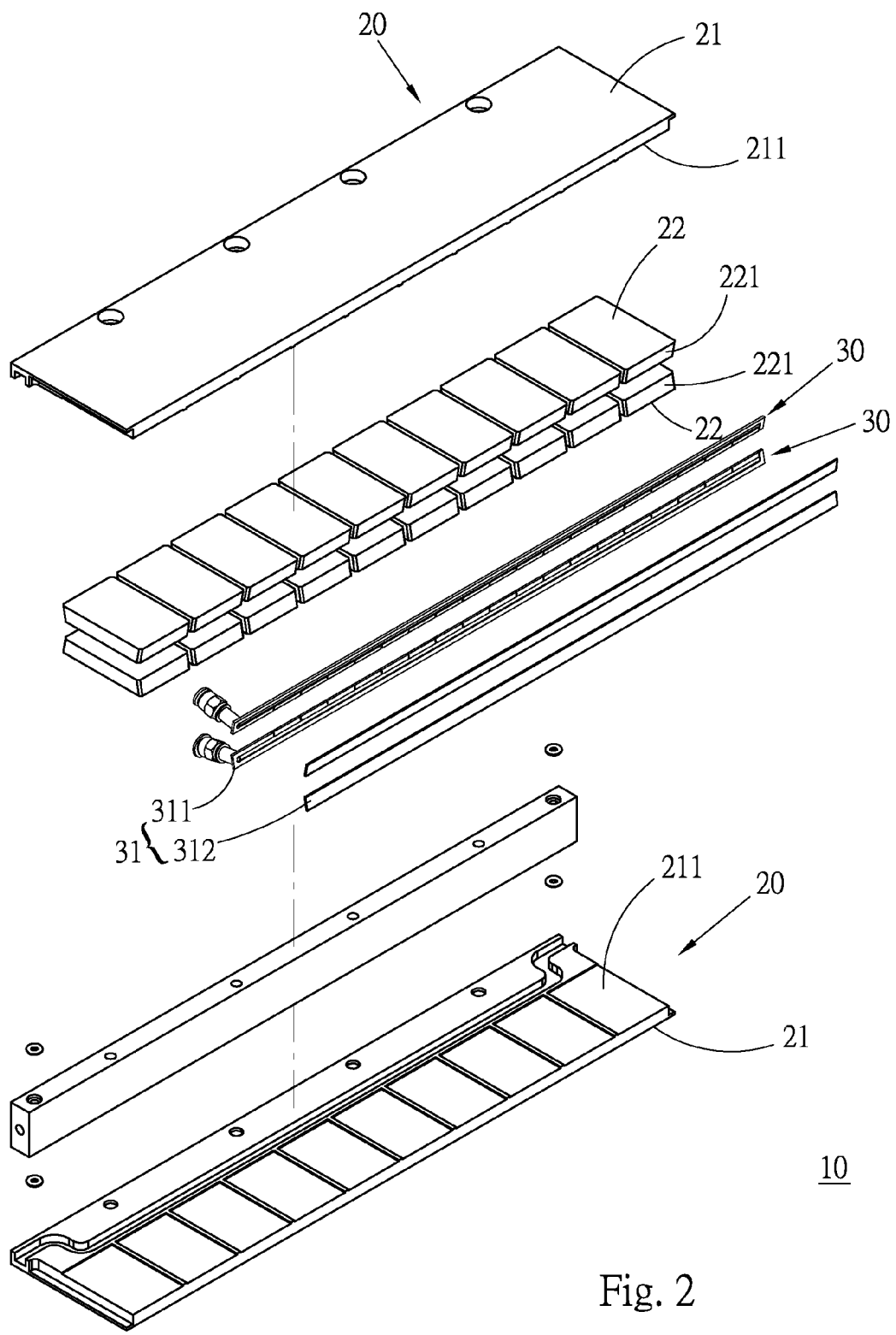
FIG. 2 is a perspective exploded view of a preferred embodiment of the present invention.
Figure 3:
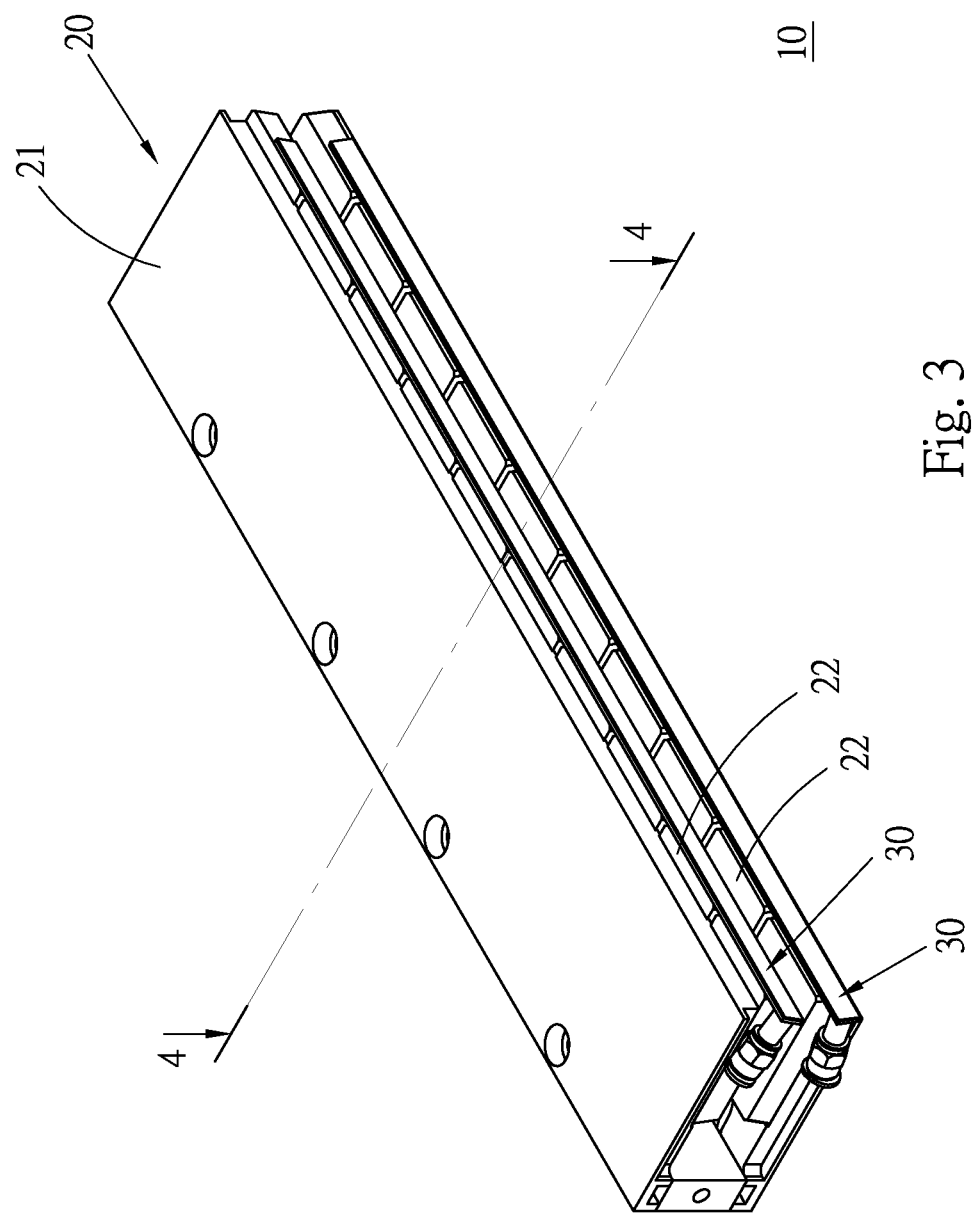
FIG. 3 is a perspective assembled view of the preferred embodiment of the present invention.
Figure 4:
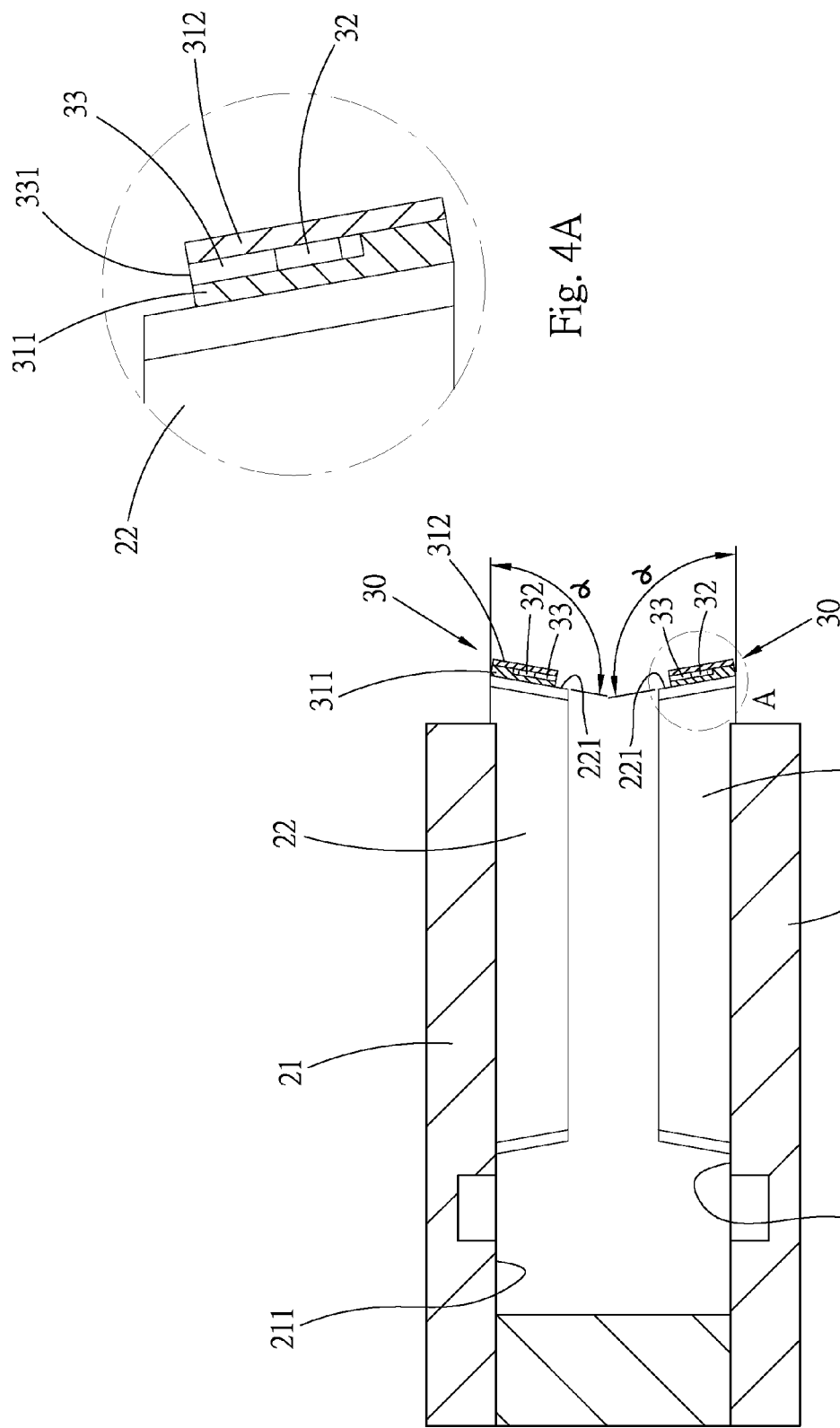
FIG. 4 is a sectional view taken along line 4-4 of FIG. 3.
Figure 5:
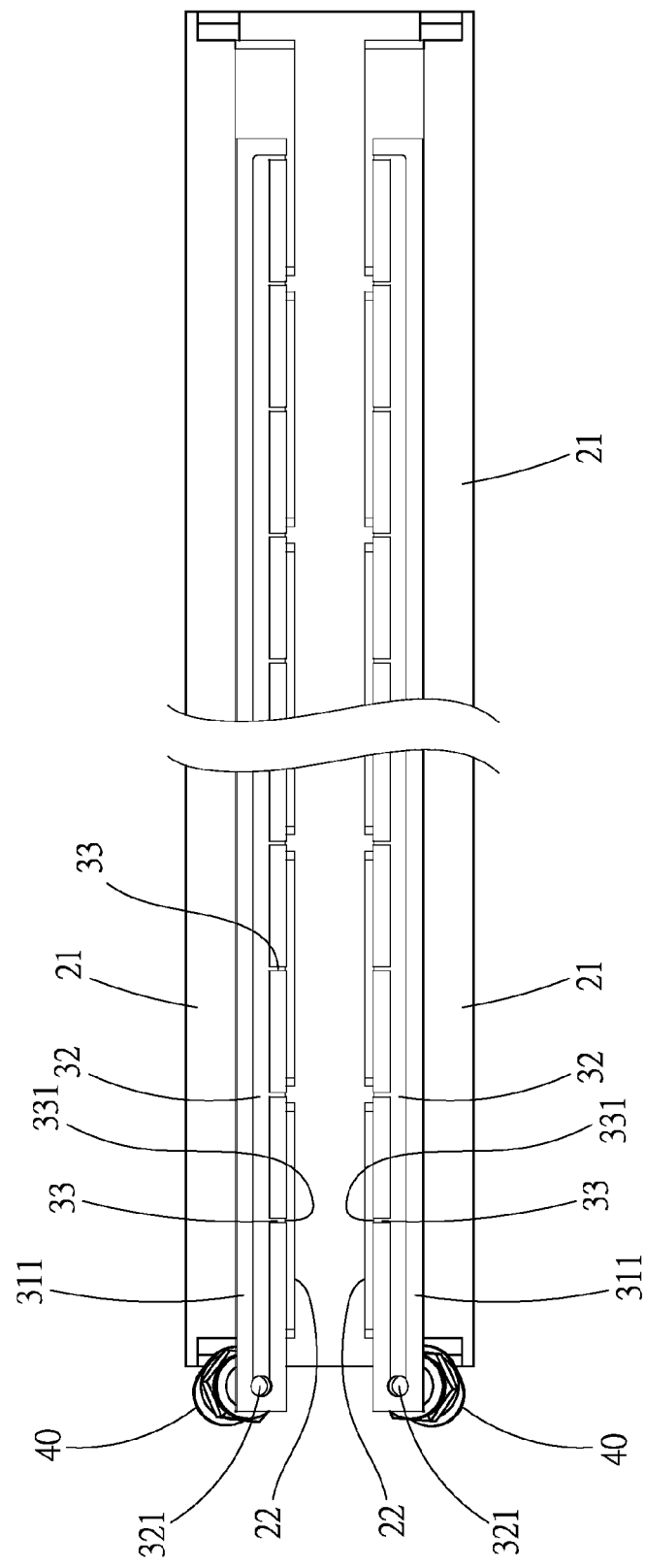
FIG. 5 is an end view of the preferred embodiment of the present invention, in which the cover boards are removed.

Please refer to FIGS. 2 to 5. According to a preferred embodiment, the linear motor air-cooling structure 10 of the present invention includes two stators 20, a mover (not shown) and two cooling sections 30.

It should be first noted that the stators 20 and the mover pertain to well known prior art of conventional linear motor. Substantially, the permanent magnets of the stators 20 form a fixed magnetic field. After the windings of the mover are powered on, the mover creates a variable magnetic field. The fixed magnetic field and the variable magnetic field interact on each other to make the mover linearly reciprocally move. This technique is well known by those skilled in this field and thus will not be further described hereinafter.

The stators 20 are elongated members spaced from each other in parallel to each other. Each stator 20 has an elongated board-shaped bed section 21 and multiple magnetic sections 22 each of which is formed of a block-shaped permanent magnet. The magnetic sections 22 are sequentially arranged at intervals along the length of the bed section 21. First faces of the magnetic sections 22 are fixedly attached to a plane face 211 of the bed section 21. The plane faces 211 of the two bed sections 21 correspondingly face each other.

To speak more specifically, each magnetic section 22 has a trapezoidal shape. The magnetic sections 22 are respectively disposed on the two bed sections in mirror-symmetry with each other. Each magnetic section 22 has a lateral side 221. The lateral side 221 and the plane face 211 of the bed section contain an obtuse angle α.

The mover (not shown) is properly positioned between the two stators 20. Under the interaction between the magnetic fields of the stators and the mover, the mover is reciprocally movable along the length of the stators 20.

Each cooling section 30 is substantially an elongated member. The cooling sections 30 are correspondingly lengthwise disposed on end faces of the stators 20 respectively. Each cooling section 30 has an elongated board-shaped main body 31. One face of the main body 31 is correspondingly attached to the lateral sides 221 of the magnetic sections 22 of the stator 20. Accordingly, the main body 31 is inclined to the bed section 21. A main flow way 22 and multiple bypass flow ways 33 are disposed in the main body 31. The air flowing within the main flow way 32 can be distributed to the respective bypass flow ways 33 to flow out from air outlets 331 of the bypass flow ways 33, which air outlets 331 are positioned on one side of the main body 31. The airflow flows in a direction away from the bed section 21 toward the multiple magnetic sections 22 disposed on the other bed section 21. Accordingly, the airflow can blow to the mover between the two stators 20 so as to cool the mover. Some of the air outlets 331 are positioned between the adjacent magnetic sections 22. In this case, the airflow can flow through the gaps between the adjacent magnetic sections 22. The rest of the air outlets 331 are positioned on outer sides of the end faces of the adjacent magnetic sections 22. Accordingly, the airflow flowing out from the air outlets 331 forms a uniform airflow fully flowing between the stators 20 and the mover to help in increasing the heat dissipation efficiency.

To speak more specifically, the main body 31 of each cooling section 30 is composed of a substrate 311 and a cover board 312 fixedly attached and connected to the substrate 311. The main flow way 32 and the bypass flow ways 33 are formed between the attached faces of the substrate 311 and the cover board 312 as a thinned air flow way. In this case, after the cooling sections 30 are added to the stators 20, the volume will not excessively increase to lead to obstruction to application.

According to the linear motor air-cooling structure 10 of the present invention, a proper pipe connector 40 is serially connected to an air inlet 321 of the main flow way 32 of the main body 31 of the cooling section 30. Under such circumstance, an external air source can be connected to the pipe connector 40 via a pipeline to form an air supply passage. Accordingly, the external air can continuously go into the main flow way 32 to distribute to the respective bypass flow ways 33 and flow out from the air outlets 331. The airflow serves to carry away and dissipate the heat generated by the mover in operation so as to avoid rise of temperature. Therefore, the motor can keep normally operating with the efficiency unaffected. The components of the linear motor air-cooling structure 10 of the present invention are simplified and easy to process and assemble. In comparison with the conventional technique, the cost of the present invention is lowered.

The above embodiments are only used to illustrate the present invention, not intended to limit the scope thereof. Many modifications of the above embodiments can be made without departing from the spirit of the present invention.

What is claimed is:

1. A linear motor air-cooling structure comprising:
   at least one elongated stator having an elongated bed section and multiple magnetic sections sequentially arranged along a length of the bed section and fixedly disposed on one face of the bed section;
   a mover positioned in adjacency to one side of the bed section, under the action of magnetic fields created by the adjacent magnetic sections, the mover being reciprocally movable along the length of the bed section; and
   at least one cooling section having at least one main flow way and multiple bypass flow ways in communication with the main flow way, whereby the air flowing within the main flow way can be distributed to the respective bypass flow ways to flow out from the bypass flow ways so as to form airflow between the stator and the mover, the air-cooling structure being characterized in that the cooling section has a main body attached to one side of the stator along the length thereof, the main flow way and the bypass flow ways being disposed on the main body, each bypass flow way having an air outlet formed on the main body, the air outlet being directed to the mover in a direction away from the bed section;
   wherein the main body includes a substrate and a cover board attached and connected to one face of the substrate, the main flow way and the bypass flow ways being formed between the substrate and the cover board.

2. The linear motor air-cooling structure as claimed in claim 1, wherein the main body is attached to a lateral side of the magnetic sections.

3. The linear motor air-cooling structure as claimed in claim 2, wherein an obtuse angle is contained between the lateral side of the magnetic sections, to which the main body is attached, and a plane face of the bed section, to which the magnetic sections are attached.

4. The linear motor air-cooling structure as claimed in claim 1, wherein the number of the stators is two and the stators are correspondingly spaced from each other in parallel to each other, the magnetic sections being positioned on the plane faces of the bed sections, which plane faces face each other.

5. The linear motor air-cooling structure as claimed in claim 4, wherein the number of the cooling sections is two and the cooling sections are respectively attached to lateral sides of the stators along the lengths thereof.

6. The linear motor air-cooling structure as claimed in claim 5, wherein the main bodies are respectively attached to the lateral sides of the corresponding magnetic sections.

7. The linear motor air-cooling structure as claimed in claim 6, wherein an obtuse angle is contained between the lateral side of the magnetic sections and the plane face of the bed section, to which the magnetic sections are attached.

8. The linear motor air-cooling structure as claimed in claim 7, wherein one end of the magnetic sections protrudes from one side of the bed section, to which the magnetic sections are attached.

9. The linear motor air-cooling structure as claimed in claim 1, wherein the magnetic sections are fixedly arranged on the bed section at equal intervals.

10. The linear motor air-cooling structure as claimed in claim 9, wherein the bypass flow ways serve to guide the airflow to flow through gaps between adjacent magnetic sections in a direction to the mover.

* * * * *